July 25, 1944.  R. E. REASON  2,354,614
OPTICAL PROJECTION SYSTEM
Original Filed June 1, 1938
Fig. 1.
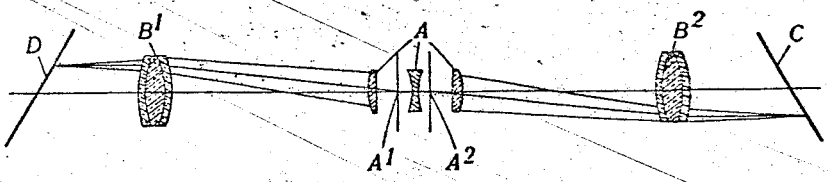
Fig. 2.
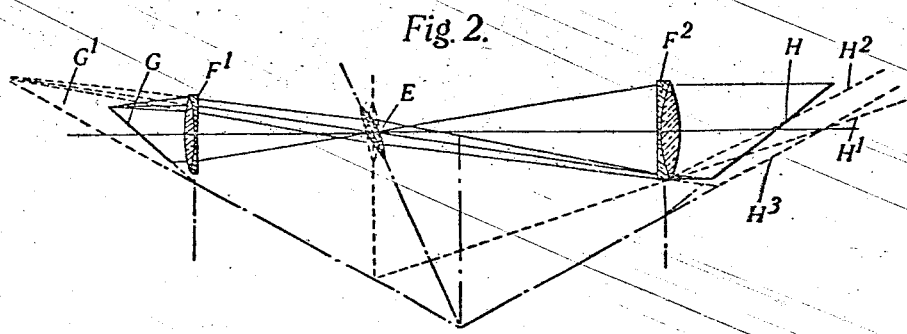
Fig. 3.
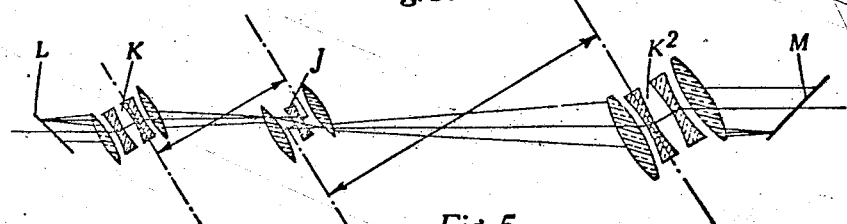
Fig. 5.
Fig. 4.
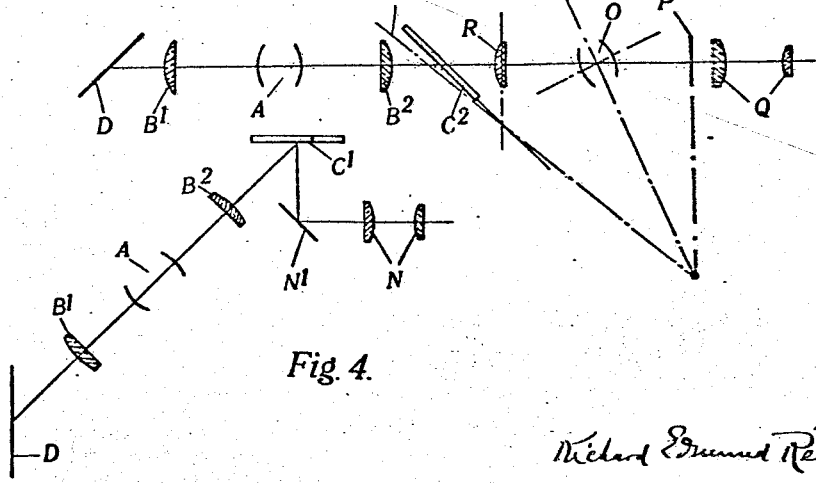
Inventor
Richard Edmund Reason
his Attorney Patented July 25, 1944

2,354,614

UNITED STATES PATENT OFFICE 2,354,614

OPTICAL PROJECTION SYSTEM

Richard Edmund Besson, Leicester, England, assignor to Kapella Limited, Leicester, England, a company of Great Britain Original application June 1, 1938, Serial No. 211,231. Divided and this application June 15, 1939, Serial No. 279,253. In Great Britain September 24, 1937

2 Claims. (Cl. 88—24)

This application is divisional from application Serial No. 211,231 filed June 1, 1938, which has become U. S. Patent No. 2,256,102, dated Sept. 16, 1941.

The invention relates to the optical projection through a finite distance of an image of an object having parts inclined to the direction of projection on to an image surface also having parts inclined to the direction of projection. With an ordinary projecting lens system, if used for projecting from an object plane on to an image plane with both planes inclined to the optical axis of the projection system, the image will be distorted, more especially by what is known as "keystone" distortion. Thus, for example, equal distances from a line in the object plane perpendicular to the line of intersection of the image and object planes will in general be projected as unequal distances in the image plane, as also will equal distances parallel to such line. Whilst it is possible, when utilising the image for measured purposes, to make allowances for such distortion, or when reprojecting the image, to correct for the distortion, it is inconvenient in practice to adopt such expedients.

The present invention has for its object to provide an optical projecting apparatus for oblique projection, by means of which a rectified image is obtained free from keystone distortion and preferably free from all distortion. Such an image can be enlarged by normal projection in an enlarging projector.

The desired oblique projection is effected according to the invention by means of a system of lenses so arranged as to collimate the principal rays in the object and image spaces, that is to say, so arranged that the principal rays in the object space are parallel to one another and those in the image space are also parallel to one another.

Although it will usually be more convenient to record the image photographically or to project it on to a diffusing screen, it will sometimes be desired to view the image directly through an eyepiece, and a further object of the invention is so to extend the rectifying oblique projecting system as to facilitate such eyepiece viewing.

Although of general applicability to all cases where rectified oblique projection is desired, the invention is especially advantageous for use in the optical measuring or testing apparatus of application Serial No. 211,231 above mentioned, and the manner in which it can be used therein is fully described in the specification of such application.

The invention may be carried into practice in various ways, but some convenient practical arrangements according thereto are illustrated diagrammatically by way of example in the accompanying drawing, in which Figure 1 illustrates a preferred oblique projecting lens system for giving a rectified image, Figures 2 and 3 show modifications thereof, and Figures 4 and 5 show extensions of the system of Figure 1 to facilitate direct viewing.

In the preferred arrangement of Figure 1, the lens system comprises a projecting lens A and two collimating lenses $B^1B^2$ spaced apart symmetrically one on either side of the projecting lens. The projecting lens A itself is preferably of the anastigmat or rectilinear type and may consist of a divergent component disposed between two convergent components symmetrically arranged, with its nodal points $A^1A^2$ in the air gaps between the components.

The two collimating lenses $B^1B^2$, each of which may consist of an achromatised triplet, are of equal focal length, and the principal focus of each lens coincides with the nodal point $A^1$ or $A^2$ of the projecting lens relating to the space in which the collimating lens lies. Each collimating lens is spherically corrected with respect to such nodal point (taking into account if necessary the convergent component of the projecting lens between the collimating lens and the nodal point), and fulfils the sine condition within the angle subtended by the projecting lens. The projecting lens A may be corrected to compensate for the aberrations, particularly astigmatism and curvature of field, introduced by the collimating lenses.

The whole system is symmetrical and produces an inverted image at unit magnification, the image and object planes CD being equally inclined to the optical axis. Slight inequality in the powers of the collimating lenses may, however, be compensated for by a slightly asymmetrical arrangement, in which the central lens A is displaced towards the weaker of the two collimating lenses.

With this arrangement the principal rays from points in the object plane D to corresponding points in the image plane C are parallel to the optical axis in the spaces outside the collimating lenses, and it will be clear that this condition ensures that a rectified image free from distortion due to the oblique projection will be obtained. Such an image can be satisfactorily enlarged by means of ordinary enlarging apparatus having its axis perpendicular to the image plane, provided that the surface of the plate or screen on which the image is projected is a true flat surface.

It is not essential to the system to employ a projecting lens between the two collimating lenses, and such lens can be omitted altogether if the object and image planes pass respectively through the foci of the two collimating lenses. The provision of the central lens, however, has the advantage of bringing the two planes closer together and this in turn facilitates correction of the aberrations.

Although it will usually be preferable to employ unit magnification in the manner above described, since the system has the property, when unit magnification is employed, that the object and image planes can be moved equal distances in the same direction relatively to the lens system within limits determined by the positions of the collimating lenses, without disturbing either focussing or magnification, and the system will act to remove substantially all distortion due to oblique projection, it will be appreciated that in some instances it will suffice to remove only keystone distortion and to depart from unit magnification. This may be done by using collimating lenses of different focal length or by displacing the central lens from the centre of the system so that it adds to the power of one of the collimating lenses, provided that a focal adjustment is maintained. In this case the necessary angular relationship to ensure accurate focussing at the desired magnification is that the ratio of the tangent of the angle between the object plane and the optical axis to that of the angle between the image plane and the optical axis should be equal to the magnification of the system. The image will, however, suffer from rectangular distortion, which can be compensated for by the use of an anamorphotic enlarging system, including one or more cylindrical lenses. Even without such compensation, a rectangularly distored image may itself be adequate, for example in cases where the relative dimensions in the undistorted direction alone are of interest, or in cases where it is desired to produce an enlarged or reduced but rectangularly distorted image.

Figures 2 and 3 show alternative arrangements wherein a rectified image free from keystone and rectangular distortion can be obtained at magnifications other than unity. This is achieved by the use of tilted lenses.

The simple arrangement of Figure 2 comprises a projecting lens E and two collimating lenses $F^1$ $F^2$ of different focal length, one on either side thereof. The collimating lenses are so spaced from the projecting lens that their principal focal points are approximately coincident with the nodal points of the projecting lens. Each collimating lens is mounted square to the optical axis of the system, i. e. has its optical axis coincident with such axis, and the projecting lens is tilted at such an angle to the axis that the object, which lies in a plane G inclined to the optical axis, is imaged in a plane H equally inclined to the axis.

The angle of tilt of the projecting lens E necessary to produce this result, can best be explained by first considering the conditions which would arise if the projecting lens were not tilted (as indicated in dotted lines). In such a case the plane $G^1$ containing the first virtual image (i. e. the virtual image of the object formed by the collimating lens $F^1$) and the plane $H^1$ containing the second virtual image (i. e. the image of the first virtual image which is formed by the projecting lens E and from which the final real image $H^2$ is formed by the second collimating lens $F^2$) intersect in the nodal plane of the projecting lens. Tilting of the projecting lens about its nodal point will not substantially alter the position of the point of intersection of the plane $H^1$ of the second virtual image and the optical axis, and the effect of such tilting will therefore be to rotate the plane $H^1$ of the second virtual image about such point of intersection into a position $H^3$. The projecting lens should therefore be tilted to such an angle as to make the virtual image planes $G^1$ and $H^1$, and therefore also the object and image planes GH, equally inclined to the optical axis.

In practice the arrangement of Figure 2 will require modification in order to provide correction for spherical and other aberrations. For this purpose the projecting lens E is preferably of the anastigmat or rectilinear type and may consist of a divergent component disposed between two convergent components symmetrically arranged with its nodal points in the air gaps between the components. In view of the tilting of the lens, the two parts of the optical axis of the system on opposite sides of it will be parallel to one another respectively through the two nodal points, and each part of such optical axis will coincide with the optical axis of the corresponding collimating lens. The collimating lenses, which may each consist of an achromatised doublet, are spherically corrected in a manner similar to that described with reference to Figure 1.

With this arrangement the principal rays from points in the object plane to corresponding points in the image plane will be parallel to the optical axis in the spaces outside the collimating lenses, and it will be clear that this condition ensures that a rectified image free from distortion due to the oblique projection will be obtained.

This arrangement may be modified by tilting the collimating lenses, either instead of or as well as the projecting lens. In such a modification the two collimating lenses should be tilted through the same angle in order to avoid keystone distortion, and in one convenient arrangement, as shown in Figure 3, all three lenses J, $K^1$, $K^2$, are equally tilted. In such cases the collimating lenses $K^1K^2$, if tilted through an appreciable angle, should preferably have the form of anastigmat lenses, special regard being paid to the correction of the aberrations within the field subtended by the projecting lens. The focal lengths of the collimating lenses are measured normally to their nodal planes from the corresponding nodal points of the projecting lens, or in other words, their principal focal points lie in the corresponding nodal planes of the projecting lens. The nodal point of the projecting lens corresponding to a collimating lens need not be the nodal point nearer to such lens, and in the example illustrated the nodal points are crossed. The arrangement of Figure 3 has the advantage that appreciable magnification can be obtained without excessive tilting of the lenses, the object and image planes LM again being equally inclined to the optical axis of the system, which is displaced parallel to itself in its passage through each lens owing to the separation of the nodal points of the lens.

The foregoing arrangements are suitable for projection of the image on to a photographic plate or a projection screen or other surface, but not for direct viewing through an eye-piece owing to the fact that the image plane is inclined to the optical axis. The systems can, however, be extended to suit direct viewing in various ways and Figures 4 and 5 show two alternative arrangements.

In the simple arrangement of Figure 4, the lens system of Figure 1 is used to project a rectified image on to a diffusing screen $C^1$ and this image is directly viewed through an eye-piece N, a plane mirror $N^1$ being shown in the path of the rays to the eye-piece. If it is desired to effect measurements of the image, a graticule may be provided in the image plane of the eye-piece so as to be superimposed on the image. This arrangement is satisfactory provided that the object can be sufficiently brightly illuminated to compensate for the loss of light due to the diffusing screen.

This difficulty is obviated in the arrangement of Figure 5, in which a rectified image is obtained by the lens system of Figure 1 on a transparent surface $C^2$ inclined to the optical axis, and a further projecting lens O is used to produce an image thereof in a plane P square to the optical axis of the whole system, so that such final image can be directly viewed through an eye-piece Q in line with the optical axis of the system. In order that the image P shall be properly in focus, the projecting lens O is tilted at such an angle that its nodal planes respectively intersect its object and image planes in two parallel lines equidistant from the inclined optical axis of the lens O. For simplicity in the drawing, the two nodal planes of the lens are assumed to be coincident. The final image will be sharply focussed, but will suffer from distortion, and in order to enable accurate measurements to be made through the eye-piece, notwithstanding such distortion, graduations are provided on the transparent surface $C^2$, so that in the final image the object and the graduations will be equally distorted. Since it would in practice be rather disturbing to attempt to make measurements on an image suffering from keystone distortion, it is preferable to provide a collimating field lens R between the surface $C^2$ and the projecting lens O, so that the final image will suffer only from rectangular distortion. In this case, as shown, the object plane of the projecting lens O is constituted by the plane S of the virtual image formed by the field lens R of the image $C^2$. The provision of the collimating lens R is also convenient in that it contributes somewhat towards the formation of the final image and can be corrected in association with the tilted projecting lens O.

What I claim as my invention and desire to secure by Letters Patent is:

1. Optical projection apparatus, comprising a system of lenses so arranged as to collimate the principal rays in the object and image spaces and having its optical axis so disposed that the ratio between the tangents of the angles made by such axis to the object and image planes is equal to the magnification of the system, a diffusing screen located in the image plane to receive the image, an eyepiece for viewing the image in a direction at right angles to the diffusing screen, and a graticule in the image plane of the eyepiece, whereby the image and the graticule will appear superimposed.

2. Optical projecting apparatus, comprising a symmetrical optical system for projecting a rectified image of an object lying in a plane inclined to the optical axis of the system on to an image plane equally inclined to such axis, a diffusing screen located in the image plane to receive the image, an eyepiece for viewing the image in a direction at right angles to the diffusing screen, and a graticule in the image plane of the eyepiece, whereby the image and graticule will appear superimposed, the symmetrical optical system consisting of a projecting lens disposed between two collimating lenses whose principal focal points respectively coincide with the nodal points of the projecting lens.

RICHARD EDMUND REASON.